May 19, 1953  J. R. MACDONALD  2,638,870
LIVESTOCK PEN LAYOUT
Filed Dec. 27, 1949  2 Sheets-Sheet 1

Inventor
John R. Macdonald

By *Clarence A. O'Brien and Harvey B. Jacobson*
Attorneys

May 19, 1953   J. R. MACDONALD   2,638,870
LIVESTOCK PEN LAYOUT
Filed Dec. 27, 1949   2 Sheets-Sheet 2
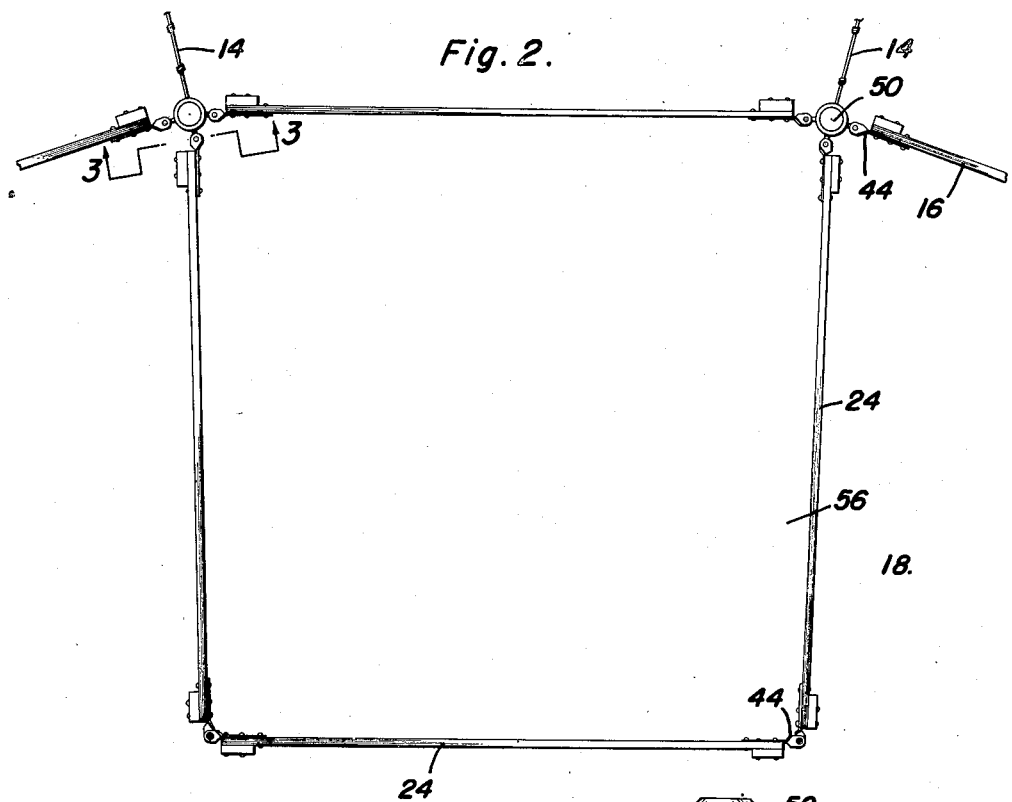
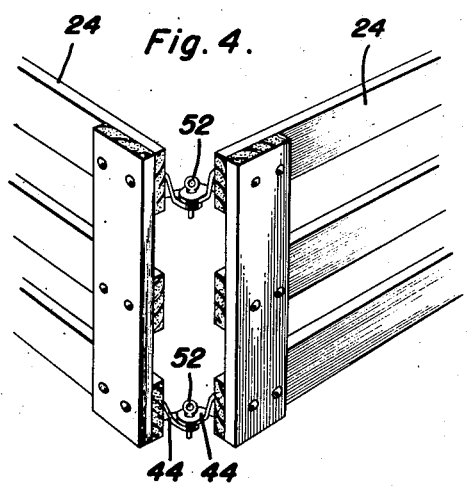
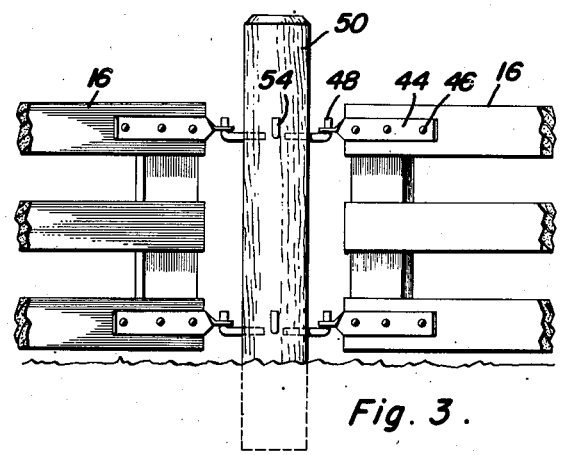
Inventor
John R. Macdonald Patented May 19, 1953

2,638,870

UNITED STATES PATENT OFFICE 2,638,870

LIVESTOCK PEN LAYOUT

John R. Macdonald, Fort Dodge, Iowa

Application December 27, 1949, Serial No. 135,133

4 Claims. (Cl. 119—15)

This invention relates to new and useful improvements in livestock farm layouts and the method of arranging the same upon a suitable plot of land.

The primary object of this invention is to improve the sanitation of a livestock raising area and to save time and effort on the part of an operator in caring for livestock.

Another important object of this invention is to enable an operator to keep livestock evenly spaced upon a plot of ground and to be able to readily shift livestock from one particular selected area to another.

Another important object of this invention is to enable an operator to segregate particular groups of livestock according to age, sex, species or the like in such a manner that any two particular groups or components thereof may be intermingled as desired without interfering with the segregation of other groups.

Another object of this invention is to enable an attendant to feed and inspect all of the animals with an absolute minimum of movement on his part, and to provide a single watering system for all of the animals while the same are segregated.

Another object of this invention is to provide a working space for the attendants communicable directly with each of the segregated groups of livestock and in which selected groups of livestock may be further segregated as desired for such operations as vaccinating, castrating, spraying or the like.

Still another object of this invention, in conformity with the foregoing objects, is to provide for drainage away from the working area and the feeding area of the livestock and preventing bogginess of the entire livestock area.

A meritorious feature of this invention resides in the provision of a plurality of pens which radiate outwardly from a working area and each of which communicate by means of a gate with the working area.

Another important feature of this invention resides in the common means provided for dispensing water to each of the pens and the disposal of the feeders and shelter houses adjacent to pen gates communicating with the working area.

Another important feature of the present invention resides in the provision of the hingedly connected gate sections in the work area which may be connected to a selected pair of partition fences for providing a segregated pocket within the working area and with each of the gate sections being swingable to open the pocket, A final feature to be specifically enumerated herein resides in the construction which permits the pen gates and the gate sections being interchangeable for increased flexibility in the use of the livestock layout.

These, together with various ancillary features and objects of the invention which will later become apparent as the following description proceeds, or attained by the present invention, preferred embodiment of which has been illustrated by way of example only in the accompanying drawings, wherein:

Figure 2 is a top plan detail view of the pen gate construction and showing the gate sections connected to the partition fences;

Figure 3 is an enlarged side elevational view illustrating particularly the hinged post construction with concealed portions being shown in dotted outline, and being taken upon the plane of the section line 3—3 of Figure 2 with the gate section removed; and, Figure 4 is a perspective detail view of the means provided for hingedly connecting the gate sections together.

Figure 1:
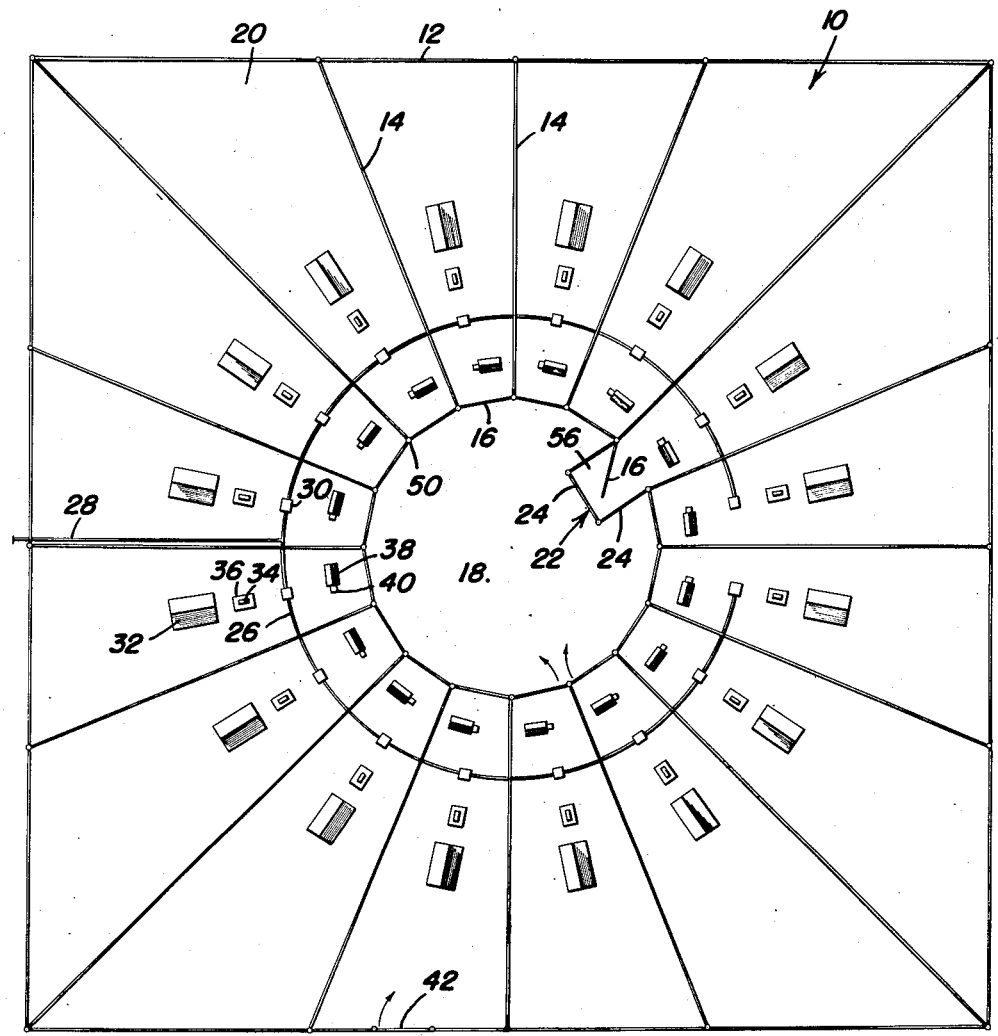
Figure 1 is a schematic top plan view of the livestock farm layout, showing the gate sections connected to adjacent partition fences and the end gate connecting the partition fences being shown in the open position.

Reference is now made more particularly to the accompanying drawings, wherein like numerals designate similar parts throughout the various views, and in which a preferably rectangular plot of land is indicated by the numeral 10.

The area 10 is enclosed by a fence 12 which will be of suitable construction to retain the type of livestock to be enclosed therein. A plurality of partition fences 14 of similar construction have their outer extremities at the closure fence 12 and they extend radially inwardly toward the center of the plot of land 10, terminating in space relationship from the center of the plot of land 10 upon the arc of a circle. The inner extremities of the partition fences 14 are connected by pen gates 16 defining a circular working area or space 18 at the center of the plot 10.

Upon reference to Figure 1 of the drawings it will be readily apparent that the closure fence 12, the partition fences 14, and the pen gates 16 define a plurality of livestock pens 20 which radiate outwardly from the working area 18, being proterminate therewith, and access being had therebetween by means of the pen gates 16.

A gate construction indicated generally at 22 is provided in the working area 18, and includes a plurality of gate sections 24 hingedly connected together in end to end relationship, the end gate sections 24 being selectively hinged to selective pairs of the innermost extremities of the partition fences 14.

Disposed in the pens 20 in concentric relations with the center of the working area 18 is a water conduit 26, which is connected by means of a water pipe 28 to a source of water supply, not shown, which communicates with a water trough 30 disposed in each of the pens 20, the water troughs 30 being of the type that are automatically self-filling in the preferred construction as will readily be understood. In addition, since this construction is especially well suited for the raising of pigs and hogs, each pen 20 is provided with a shelter house 32, a creep feeder 34 having an enclosing fence 36, and a main feeder 38, the latter of which includes in the preferred construction a feeder of the type such as that known under the trade name "Vy-Tab-O-Lator" 40. In addition, a gate 42 is provided in the closure fence 12 to provide access by attendants to the working area 18 and the pens 20.

As shown clearly in Figure 3, the pen gates 16 have straps 44 secured to their ends by means of fasteners 46, which extend from the end of the gate 16 and are twisted through a right angle adjacent their outer ends and apertured to form an eye for receiving the hinge post 48 which is suitably secured to the fence post 50 at the inner extremity of the partition fences 14. Two sets of vertically spaced hinge posts 48 are disposed upon substantially opposite sides of the fence posts 50 for hingedly supporting the adjacent pen gate 16. Since each of the fence posts 50 are similarly constructed and opposite ends of each of the pen gates 16 are similarly constructed, it will be readily apparent that each of the pen gates 16 may be swung about either of its ends as a pivot and inwardly or outwardly from the pens 20 as desired. In the preferred construction each of the gate sections 24 are constructed substantially identical with the pen gate 16, whereby adjacent gate sections are hingedly connected together by means of the hinge pins 52 provided for this purpose, as clearly shown in Figure 4. The fence posts 50 are each provided with an additional set of vertically spaced hinge posts 54 to which the free outer ends of the gate construction 22 may be hingedly secured in a manner analogous to which the pen gates 16 are pivoted thereto. It will be evident by this construction that the gate construction 22 may be secured to any two selected pairs of posts 50, and as shown in Figure 2, this will define an additional segregation pocket 56 within the working area 18. The pocket 56 may be opened by swinging the gate 16 or any of the gate sections 24 by the simple expedient of either removing the pins 52 or removing the gate section 24 from the hinged posts 54 as will be clearly obvious from the drawings.

Although it is usually preferred that the working area 18 be disposed in the geometric center of the area 10, in the event that the area 10 has low spots or has a rolling contour, it is preferred that the working area 18 be located upon the highest point in the field 10 in the interests of adequate drainage from the area, and the area of the pens 20 seeded in suitable legumes such as alfalfa and clover to prevent erosion, prevent the pens 20 from being converted into bogs, and to generally improve the land.

From the foregoing, the construction and operation of the device will be readily understood and further explanation is believed to be unnecessary.

However, since numerous modifications and changes will readily occur to those skilled in the art after a consideration of the foregoing specification and the accompanying drawings, it is not desired to limit the invention to the exact construction shown and described, but all suitable modifications and equivalents may be resorted to, falling within the scope of the appended claims.

Having described the invention, what is claimed as new is:

1. A livestock pen layout comprising a closure fence enclosing a surface area, a plurality of spaced partition fences in said area each having its outermost extremity at said closure fence and its innermost extremity disposed upon an arc of a circle in the area, pen gates hingedly connecting the innermost extremity of each of the partition fences to the innermost extremity of the immediately adjacent partition fence, said pen gates, partition fences, and closure fence dividing said area into a plurality of livestock pens each of which is coterminous with a sector of a circle defined by said pen gates constituting a working space separated from each of said pens by one of said pen gates, a segregation pocket disposed in said working space including a plurality of gate sections hingedly connected together in end-to-end relation, the end gate sections of said pocket being hinged to the innermost extremities of a selected pair of adjacent partition fences, the pen gate connecting said selected pair of partition fences comprising an end wall of said pocket.

2. A livestock pen layout comprising a closure fence enclosing a surface area, a plurality of spaced partition fences in said area each having its outermost extremity at said closure fence and its innermost extremity disposed upon an arc of a circle in the area, pen gates hingedly connecting the innermost extremity of each of the partition fences to the innermost extremity of the immediately adjacent partition fence, said pen gates, partition fences, and closure fence dividing said area into a plurality of livestock pens each of which is coterminous with a sector of a circle defined by said pen gates constituting a working space separated from each of said pens by one of said pen gates, a segregation pocket disposed in said working space including a plurality of gate sections hingedly connected together in end-to-end relation, the end gate sections of said pocket being hinged to the innermost extremities of a selected pair of adjacent partition fences, the pen gate connecting said selected pair of partition fences comprising an end wall of said pocket, the corners of said pocket being disposed on the radial center lines between the next adjacent fences on either side of those fences to which said end gate sections are attached, each of said gate sections being selectively operable to open and connect said pocket with adjacent pens whereby livestock may be segregated between adjacent pens without interfering with the working area.

3. A livestock pen layout comprising a closure fence defining an enclosed surface area, said surface area including a circular working area, a plurality of spaced partition fences each having its outermost extremity at the closure fence and extending radially inwardly towards and terminating at the periphery of the circular working area, pen gates hingedly connecting the innermost extremity of each of the partition fences to the innermost extremity of the immediately adjacent partition fence, said pen gates defining the substantially circular periphery of said working area, said pen gates, partition fences and closure fence defining a plurality of pens radiating from the working area, each being separated therefrom by a pen gate, the corners of said pocket being disposed on the radial center lines between the next adjacent fences on either side of those fences to which said end gate sections are attached, each of said gate sections being selectively operable to open and connect said pocket with adjacent pens whereby livestock may be segregated between adjacent pens without interfering with the working area.

4. A livestock farm layout comprising a central, circular working area, a plurality of radially extending partition fences defining pens therebetween extending from said working area, the innermost extremities of said partition fences defining the boundary of said working area, pen gates hingedly connected to and extending between the innermost extremities of adjacent partition fences, a segregation pocket disposed in said working space including a plurality of gate sections hingedly connected together in end to end relation, the end gate sections of said pocket being hinged to the innermost extremities of a selected pair of adjacent partition fences, the pen gate connecting said selected pair of fences comprising a closing wall for said pocket, the corners of said pocket being disposed on the radial center lines between the next adjacent fences on either side of those fences to which said end gate sections are attached, each of said gate sections being selectively operable to open and connect said pocket with adjacent pens whereby livestock may be segregated between adjacent pens without interfering with the working area.

JOHN R. MACDONALD.

References Cited in the file of this patent

UNITED STATES PATENTS

| Number | Name | Date |
|---|---|---|
| 493,355 | Erickson | Mar. 14, 1893 |
| 1,708,098 | Karley | Apr. 9, 1929 |
| 1,744,692 | Wessel | Jan. 21, 1930 |
| 1,848,690 | Bayley et al. | Mar. 8, 1932 |
| 2,222,680 | Morris et al. | Nov. 26, 1940 |

FOREIGN PATENTS

| Number | Country | Date |
|---|---|---|
| 401,964 | Great Britain | Nov. 23, 1933 |